US008381285B2

(12) United States Patent
Dau et al.

(10) Patent No.: US 8,381,285 B2
(45) Date of Patent: Feb. 19, 2013

(54) SYSTEMS AND METHODS FOR GENERATING CONSTRAINTS FOR USE IN ACCESS CONTROL

(75) Inventors: Frithjof Dau, Dresden (DE); Martin Knechtel, Dresden (DE)

(73) Assignee: SAP AG, Walldorf (DE)

( * ) Notice: Subject to any disclaimer, the term of this patent is extended or adjusted under 35 U.S.C. 154(b) by 307 days.

(21) Appl. No.: 12/823,884

(22) Filed: Jun. 25, 2010

(65) Prior Publication Data

US 2011/0321154 A1     Dec. 29, 2011

(51) Int. Cl.
*G06F 21/00* (2006.01)
*G06F 17/30* (2006.01)
(52) U.S. Cl. .................... 726/17; 707/781; 707/787
(58) Field of Classification Search ............. 726/17
See application file for complete search history.

(56) References Cited

U.S. PATENT DOCUMENTS

| 7,712,127 | B1 * | 5/2010 | Thompson et al. | 726/4 |
|---|---|---|---|---|
| 7,716,244 | B2 * | 5/2010 | Abrams et al. | 707/785 |
| 2003/0221030 | A1 * | 11/2003 | Pontius et al. | 710/107 |
| 2006/0236408 | A1 | 10/2006 | Yan | 726/29 |
| 2011/0219425 | A1 * | 9/2011 | Xiong et al. | 726/1 |
| 2011/0283281 | A1 * | 11/2011 | Svetov et al. | 718/100 |

OTHER PUBLICATIONS

Wang et al., "A Logic-based Framework for Attribute based Access Control", Oct. 29, 2004, FMSE, pp. 45-55.*
Jaeger et al., "Managing Access Control Policies Using Access Control Spaces", Jun. 3-4, 2002, SACMAT, pp. 3-12.*
Junghwa Chae, "Modeling of the Role-Based Access Control Policy with Constraints Using Description Logic", 2007, ICCSA, LNCS 4705, Part I, pp. 500-511.*
Finin et al., "ROWLBAC—Representing Role Based Access Control in OWL", Jun. 11-13, 2008, SACMAT, pp. 73-82.*
Butler W. Lampson, "Protection," in Proceedings of the 5th Annual Princeton Conference on Information Sciences and Systems, pp. 437-443, 1971.
R. Sandhu, D. Ferraiolo, and R. Kuhn, "The NIST Model for Role-Based Access Control: Towards a Unified Standard," in RBAC '00: Proceedings of the Fifth ACM Workshop on Role-Based Access Control, pp. 47-63, ACM, 2000.
G. Saunders, M. Hitchens, and V. Varadharajan, "Role-Based access Control and the Access Control Matrix," SIGOPS Oper. Syst. Rev. vol. 35, No. 4, pp. 6-20, 2001.
Franz Baader, D. Calvanese, D.L. McGuinness, D. Nardi, and P.F. Patel-Schneider, "The Description Logic Handbook: Theory, Implementation and Applications," Chapter 2, pp. 47-100, Cambridge University Press, 2nd Ed. 2007.
M. Knechtel and J. Hladik, "RBAC Authorization Decision with DL Reasoning," in ICWI '08: Proceedings of the IADIS Int. Conf. WWW/Internet, 2008.

(Continued)

*Primary Examiner* — Matthew Smithers
(74) *Attorney, Agent, or Firm* — Fountainhead Law Group PC

(57) ABSTRACT

In one embodiment the present invention includes a computer-implemented method for generating constraints for use in an access control system. In one embodiment, roles, document types, and permissions are stored in a 3-D model, such as a matrix or table. The 3-D model is converted to 2-D models, where users are inserted for roles and documents are inserted for document types. The 3-D model and 2-D models represent access rights. Supplemental information about the access rights is added to the 2-D tables. In one embodiment, attribute exploration is used to generate supplemental information. Constraints are generated from the 2-D tables for use in controlling access rights in a computer system.

20 Claims, 14 Drawing Sheets

OTHER PUBLICATIONS

M. Knechtel, J. Hladik, and F. Dau, "Using OWL DL Reasoning to Decide about Authorization in RBAC," in OWLED '08: Proceedings of the OWLED 2008 Workshop on OWL: Experiences and Directions, 2008.

J-H. Chae and N. Shiri, "Formalization of RBAC Policy with Object Class Hierarchy," in Information Security Practice and Experience (ISPEC), pp. 162-176, 2007.

F. Baader, B. Ganter, U. Sattler, and B. Sertkaya, "Completing Description Logic Knowledge Bases using Formal Concept Analysis," in Proceedings of the Twentieth Int. Joint Conference. on Artificial Intelligence (IJCAI-07), AAAI Press, 2007.

C. Lutz and U. Sattler, "Mary Likes All Cats," in Proceedings of the 2000 Int. Workshop in Description Logics (DL2000) (F. Baader and U. Sattler, eds.), No. 33 in CEUR-WS, (Aachen, Germany), pp. 213-226, RWTH Aachen, Aug. 2000.

S. Rudolph, M. Kroetzsch, and P. Hitzler, "All Elephants are Bigger than All Mice," in Proceedings of the 21st International Workshop on Description Logics (DL2008) 2008.

B. Ganter and S.A. Obiedkov, "Implications in Triadic Formal Contexts," in Proceedings of the 12 International Conference on Conceptual Structures (ICCS 2004) (K.E. Wolff, H.D. Pfeiffer, and H.S. Delugach, eds.) vol. 3127 of Lecture Notes in Computer Science, pp. 186-195, Springer, 2004.

Hyuk Jin Ko and Woojun Kang, "Enhanced Access Control with Semantic Context Hierarchy Tree for Ubiquitous Computing," in IJCSNS International Journal of Computer Science and Network Security, vol. 8, No. 10, Oct. 2008.

Chen Zhao, Nuermaimaiti Heilili, Shengping Liu and Zuoquan Lin, "Representation and Reasoning on RBAC: A Description Logic Approach," ITAC, 2005.

Tim Finin, Anupam Josh, Lalana, Kagal, Jianwei Niu, Ravi Sandhu, William H. Winsborough, Bhavani Thuraisingham, "Using OWL to Model Role Based Access Control," UMBC Ebiquity Laboratory Technical Report, Feb. 2008.

\* cited by examiner

|  | user manual | marketing document | customer contract document | terms of use document | installation guide | external technical interface document | design document | rating entry |
|---|---|---|---|---|---|---|---|---|
| marketplace visitor |  |  |  |  |  |  |  |  |
| service consumer |  |  | X | X |  |  |  |  |
| software development engineer |  | X |  |  |  |  |  |  |
| service vendor | X | X | X | X | X | X | X |  |
| legal department employee |  |  |  |  |  |  |  |  |
| service provider |  |  |  |  |  |  |  |  |
| marketing employee |  |  |  |  |  |  |  |  |
| technical editor |  |  |  |  |  |  |  |  |
| customer service employee |  |  |  |  |  |  |  |  |

*Fig. 5A*

|  | user manual | marketing document | customer contract document | terms of use document | installation guide | external technical interface document | design document | rating entry |
|---|---|---|---|---|---|---|---|---|
| marketplace visitor |  | x |  | x |  |  |  | x |
| service consumer | x | x | x | x |  | x |  | x |
| software development engineer | x | x |  | x | x | x | x | x |
| service vendor | x | x | x | x | x | x | x | x |
| legal department employee | x | x | x | x | x | x | x | x |
| service provider | x | x |  | x | x | x |  | x |
| marketing employee | x | x |  | x | x | x | x | x |
| technical editor | x | x |  | x | x | x | x | x |
| customer service employee | x | x | x | x | x | x | x | x |

*Fig. 5B*

|  | user manual | marketing document | customer contract document | terms of use document | installation guide | external technical interface document | design document | rating entry |
|---|---|---|---|---|---|---|---|---|
| marketplace visitor | | | | | | | | |
| service consumer | | | | | | | | x |
| software development engineer | x | | | | x | x | x | |
| service vendor | | | | | | | | |
| legal department employee | | | x | x | | | | |
| service provider | | | | | | | | |
| marketing employee | | x | | | | | | |
| technical editor | x | | | | x | x | x | |
| customer service employee | | | x | | | | | |

*Fig. 5C*

|  | user manual | marketing document | customer contract document | terms of use document | installation guide | external technical interface document | design document | rating entry |
|---|---|---|---|---|---|---|---|---|
| marketplace visitor1 |  |  |  |  |  |  |  |  |
| service consumer1 |  |  | X | X |  |  |  |  |
| software development engineer1 |  | X |  |  |  |  |  |  |
| service vendor1 | X | X | X | X | X | X | X |  |
| legal department employee1 |  |  |  |  |  |  |  |  |
| service provider1 |  |  |  |  |  |  |  |  |
| marketing employee1 |  |  |  |  |  |  |  |  |
| technical editor1 |  |  |  |  |  |  |  |  |
| customer service employee1 |  |  |  |  |  |  |  |  |
| expert........ |  |  |  |  |  |  |  |  |
| expert......X. |  |  |  |  |  |  | X |  |
| expert.....X.. |  |  |  |  |  | X |  |  |
| expert.....XX. |  |  |  |  |  | X | X |  |
| expert....X... |  |  |  |  | X |  |  |  |

*Fig. 6A*

|  | user manual | marketing document | customer contract document | terms of use document | installation guide | external technical interface document | design document | rating entry |
|---|---|---|---|---|---|---|---|---|
| marketplace visitor1 |  | X |  | X |  |  |  | X |
| service consumer1 | X | X | X | X |  | X |  | X |
| software development engineer1 | X | X |  | X | X | X | X | X |
| service vendor1 | X | X | X | X | X | X | X | X |
| legal department employee1 | X | X | X | X | X | X | X | X |
| service provider1 | X | X |  | X | X | X |  | X |
| marketing employee1 | X | X |  | X | X | X | X | X |
| technical editor1 | X | X |  | X | X | X | X | X |
| customer service employee1 | X | X | X | X | X | X | X | X |
| translator.X.X...X |  | X |  | X |  |  |  | X |
| translator.X.X..XX |  | X |  | X |  |  | X | X |
| translator.X.X.X.X |  | X |  | X |  | X |  | X |
| translator.X.X.XXX |  | X |  | X |  | X | X | X |

*Fig. 6B*

|  | user manual | marketing document | customer contract document | terms of use document | installation guide | external technical interface document | design document | rating entry |
|---|---|---|---|---|---|---|---|---|
| marketplace visitor1 | | | | | | | | |
| service consumer1 | | | | | | | | X |
| software development engineer1 | X | | | | X | X | X | |
| service vendor1 | | | | | | | | |
| legal department employee1 | | | X | X | | | | |
| service provider1 | | | | | | | | |
| marketing employee1 | | X | | | | | | |
| technical editor1 | X | | | | X | X | X | |
| customer service employee1 | | | X | | | | | |
| translator........ | | | | | | | | |
| translator.......X | | | | | | | | X |
| translator......X. | | | | | | | X | |
| translator......XX | | | | | | | X | X |

*Fig. 6C*

|     | mayOpen ||||||||  mayWrite ||||||||  mayApprove ||||||||
| --- | UM | MD | CCD | ToUD | IG | ETID | DD | RE | UM | MD | CCD | ToUD | IG | ETID | DD | RE | UM | MD | CCD | ToUD | IG | ETID | DD | RE |
| MV  |    | x  | x   |      |    |      | x  |    |    |    |     |      |    |      |    |    |    |    |     |      |    |      |    |    |
| SC  | x  | x  | x   | x    |    | x    | x  |    |    |    |     |      |    |      |    | x  |    | x  | x   |      |    |      |    |    |
| SDE | x  | x  |     | x    | x  | x    | x  | x  | x  |    |     |      | x  | x    | x  |    |    | x  |     |      |    |      |    |    |
| SV  | x  | x  | x   | x    | x  | x    | x  | x  |    |    |     |      |    |      |    |    | x  | x  | x   | x    | x  | x    | x  |    |
| LDE | x  | x  | x   | x    | x  | x    | x  | x  |    |    | x   | x    |    |      |    |    |    |    |     |      |    |      |    |    |
| SP  | x  | x  |     | x    | x  | x    | x  |    |    |    |     |      |    |      |    |    |    |    |     |      |    |      |    |    |
| ME  | x  | x  |     | x    | x  | x    | x  |    |    |    |     |      | x  |      |    |    |    |    |     |      |    |      |    |    |
| TE  | x  | x  |     | x    | x  | x    | x  | x  | x  |    |     |      |    | x    | x  | x  |    |    |     |      |    |      |    |    |
| CSE | x  | x  | x   | x    | x  | x    | x  | x  |    |    | x   |      |    |      |    |    |    |    |     |      |    |      |    |    |

Table 1. Our example RBAC matrix

*FIG. 7*

|     | UM | MD | CCD | ToUD | IG | ETID | DD | RE |
|-----|----|----|-----|------|----|------|----|----|
| MV  |    |    |     |      |    |      |    |    |
| SC  |    |    |     |      |    |      |    | x  |
| SDE | x  |    |     | x    | x  | x    |    |    |
| SV  |    |    |     |      |    |      |    |    |
| LDE |    |    | x   | x    |    |      |    |    |
| SP  |    |    |     |      |    |      |    |    |
| ME  |    | x  |     |      |    |      |    |    |
| TE  | x  |    |     | x    | x  | x    |    |    |
| CSE |    |    | x   |      |    |      |    |    |

|          | UM | MD | CCD | ToUD | IG | ETID | DD | RE |
|----------|----|----|-----|------|----|------|----|----|
| $agent_1$  |    |    |     |      |    |      |    |    |
| $agent_2$  |    |    |     |      |    |      |    | x  |
| $agent_3$  | x  |    |     |      | x  | x    | x  |    |
| $agent_4$  |    |    |     |      |    |      |    |    |
| $agent_5$  |    |    |     |      | x  | x    |    |    |
| $agent_6$  |    |    |     |      |    |      |    |    |
| $agent_7$  |    | x  |     |      |    |      |    |    |
| $agent_8$  | x  |    |     |      | x  | x    | x  |    |
| $agent_9$  |    |    |     | x    |    |      |    |    |
| $agent_{10}$ |   |    |     | x    | x  | x    |    |    |
| $agent_{11}$ | x |    | x   |      | x  | x    | x  | x  |
| $agent_{12}$ |   |    | x   | x    |    |      |    |    |

Table 3. The context $K^{mayWrite}_{R,D}$ and one possible instantiation.

*FIG. 8*

Fig. 9. The instantiation context $K_{D \times R, P}$ and its concept lattice

SYSTEMS AND METHODS FOR GENERATING CONSTRAINTS FOR USE IN ACCESS CONTROL

BACKGROUND

The present invention relates to computing, and in particular, to a systems and methods for generating constraints for use in an access control system.

Unless otherwise indicated herein, the approaches described in this section are not prior art to the claims in this application and are not admitted to be prior art by inclusion in this section.

Organizations have a need to monitor their business activities and control access to documents in a software system. Access control software may be used to restrict actions of users on a computer system, particularly an enterprise computer system. Generally, many actions (i.e., document transactions or manipulations) can be performed on an enterprise system. For example, possible actions include creating a vendor, paying a vendor, creating a user, or approving a document. Thus, completion of an action may require the authority to access the data associated with the action.

FIG. 1 illustrates a computer system using access control. Access control software 111 may be used to control authorization privileges of users of a plurality of software systems, such as an Enterprise Software System 100, for example. Enterprise Software System 100 may include multiple software systems 101, 150 and 151, for example, which may be Enterprise Resource Planning ("ERP") Applications, Customer Relationship Management ("CRM") Applications, or other software systems from SAP®, Oracle®, Microsoft®, or Saleforce.com®, for example. Examples of Enterprise Software Systems include SAP® ERP, Peoplesoft®, JD Edwards® EnterpriseOne, and Oracle® E-Business Suite. Enterprise Software System 100 may be used to manage and run an organization's computer implemented business processes, which may include order fulfillment or billing, for example. In doing so, Enterprise Software System 100 may need to control various computer implemented business operations like manufacturing, supply chain management, financial management, human resources, and customer relationship management. Furthermore, users (e.g., the organization's employees) may interact with Enterprise Software System 100 in order to execute business actions relating to their job functions. In this example, software system 101 may include a plurality of application pages 107A-C that users may access to perform various actions (e.g., creating a purchase order or paying an invoice).

Numerous users may be set up to use the different software systems. In particular, when a new employee of an organization is hired by a company, the user may be given access to specific functionality within one or more systems to perform his or her job functions within the company. Specifically, users may be assigned "roles" 130 that may be used to determine the allowable actions a user may perform, where particular roles have particular access rights within the system. For example, User 1 may be an employee in the Human Resources ("HR") department. Accordingly, User 1 is associated with "role" 120, which may be give User 1 access to perform particular actions in software systems 101 and 151. Similarly, User 2 may be an employee in the Accounts Payable ("AP") department, and may be associated with role 121 and given access to perform particular actions in software systems 101 and 150. Likewise, User 3 may be an employee in the Purchasing department, and may be associated with role 122 and given access to perform particular actions in software system 150. Finally, user 4 may be an employee in the Contracts department, and may be associated with role 123 and given access to software functionality in software system 101. In some situations, different users may have a number of different roles within the company, and may have access to corresponding software functionality to perform actions relating to such roles.

To perform their job functions using the various software systems available within the company, each user may be given particular authorizations to perform particular authorized actions in each software systems. For example, User 3 in Purchasing may be authorized to access a purchase order component of a software system and generate a purchase order for a new or preexisting supplier. Authorized actions associated with different roles 130 may be controlled using "permissions" 112. Accordingly, User 3 in an HR role 120 may further be associated with a "permission" to manipulate data so that the amount of the purchase order or the supplier information, for example, can be recorded in the system. Similarly, User 2 in an Accounts Payable role 121 may be authorized to access an invoice payment component of a software system and pay purchase orders received by the company. As with User 1, User 2 may be given permission to manipulate data corresponding to the action of paying the purchase order so that the supplier's bank information or payment terms (e.g., due on receipt or due 30 days after an invoice date), for example, can be recorded in the system.

The permissions (or authorizations) to perform various actions within each software system are typically stored as user account data in a persistent storage mechanism, such as data repository (e.g., a database 102 in FIG. 1) or another computer readable storage medium. Examples of a data repository 102 include Microsoft SQL Server, IBM, DB2, Oracle Database, and MySQL. For example, when an employee enters the company, an information technology ("IT") employee may create a new user account on each software system that the new user needs to access, and may define the actions and data manipulation permissions the user may require in order to perform his or her job function or role within the company.

It is desirable to have more efficient and comprehensive approaches to controlling access to documents in a computer system. Specifically, it would be advantageous to have an improved access control system for controlling actions on documents in a computer system.

SUMMARY

In one embodiment the present invention includes a computer-implemented method for generating constraints for use in an access control system. In one embodiment, roles, document types, and permissions are stored in a 3-D model, such as a matrix or table. The 3-D model is converted to 2-D models, where users are inserted for roles and documents are inserted for document types. The 3-D model and 2-D models represent access rights. Supplemental information about the access rights is added to the 2-D tables. In one embodiment, attribute exploration is used to generate supplemental information. Constraints are generated from the 2-D tables for use in controlling access rights in a computer system.

In one embodiment, the present invention includes a method comprising storing data corresponding to a plurality of roles, a plurality of document types, and a plurality of permissions, wherein each role includes a plurality of users assigned to the corresponding role, wherein each document type is associated with a plurality documents having a lease one common characteristic, and wherein permissions specify authorization to perform particular actions based on said roles and said document types, and wherein the roles, documents types, and permissions are related according to a three-dimensional model, converting the three-dimensional model into a plurality of two-dimensional models, the plurality of two-dimensional models comprising a first model having rows of users from each role and columns of document types, a second model having rows of documents from the document types and columns of roles, and a third model having rows of tuples comprising users and documents and columns of permissions, wherein an element at an intersection of a row and column specifies access rights between users, documents, and permissions, and generating constraints from the two-dimensional models to define access rights in a computer system.

In one embodiment, the constraints are specified using description logic.

In one embodiment, the description logic is received by a reasoning software system, the reasoning software system controlling access rights in an access control component of a computer system.

In one embodiment, the method further comprises interactively, with a user, performing attribute exploration, and in accordance therewith, supplementing one or more of said two-dimensional matrices.

In one embodiment, the first model corresponds to a first permission of the plurality of permissions, the plurality of two-dimensional models further comprising a fourth model corresponding to a second permission of the plurality of permissions, the fourth model having rows of users from each role and columns of document types.

In one embodiment, the second model corresponds to a first permission of the plurality of permissions, the plurality of two-dimensional models further comprising a fourth model corresponding to a second permission of the plurality of permissions, the fourth model having rows of documents from the document types and columns of roles.

In one embodiment, the columns of permissions in the third model include a column corresponding to no permissions.

In one embodiment, the three-dimensional model and the two-dimensional models are matrices. Matrices may be represented in a computer as tables, for example.

The following detailed description and accompanying drawings provide a better understanding of the nature and advantages of the present invention.

BRIEF DESCRIPTION OF THE DRAWINGS

FIGS. 5A-C illustrates an example models according to an embodiment of the present invention.

FIGS. 6A-C illustrates an example instantiations of models according to an embodiment of the present invention.

FIG. 7 illustrates another example of a three-dimensional matrix of roles, document types and permissions according to an embodiment of the present invention.

FIG. 8 illustrates two-dimensional matrices according to an embodiment of the present invention.

DETAILED DESCRIPTION

Described herein are techniques for secure access of data on a computer system. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
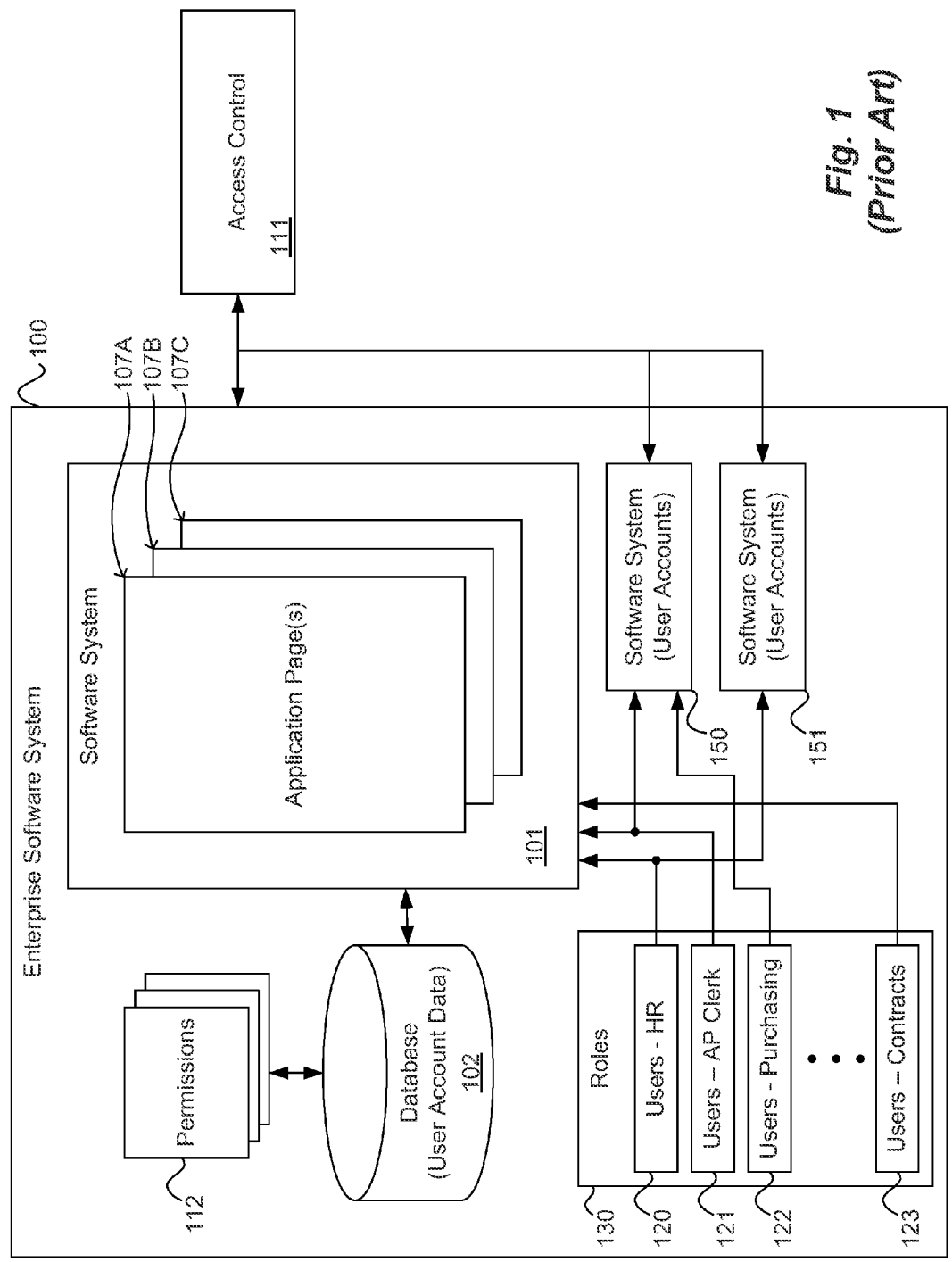
FIG. 1 illustrates a computer system using access control.
Figure 2:
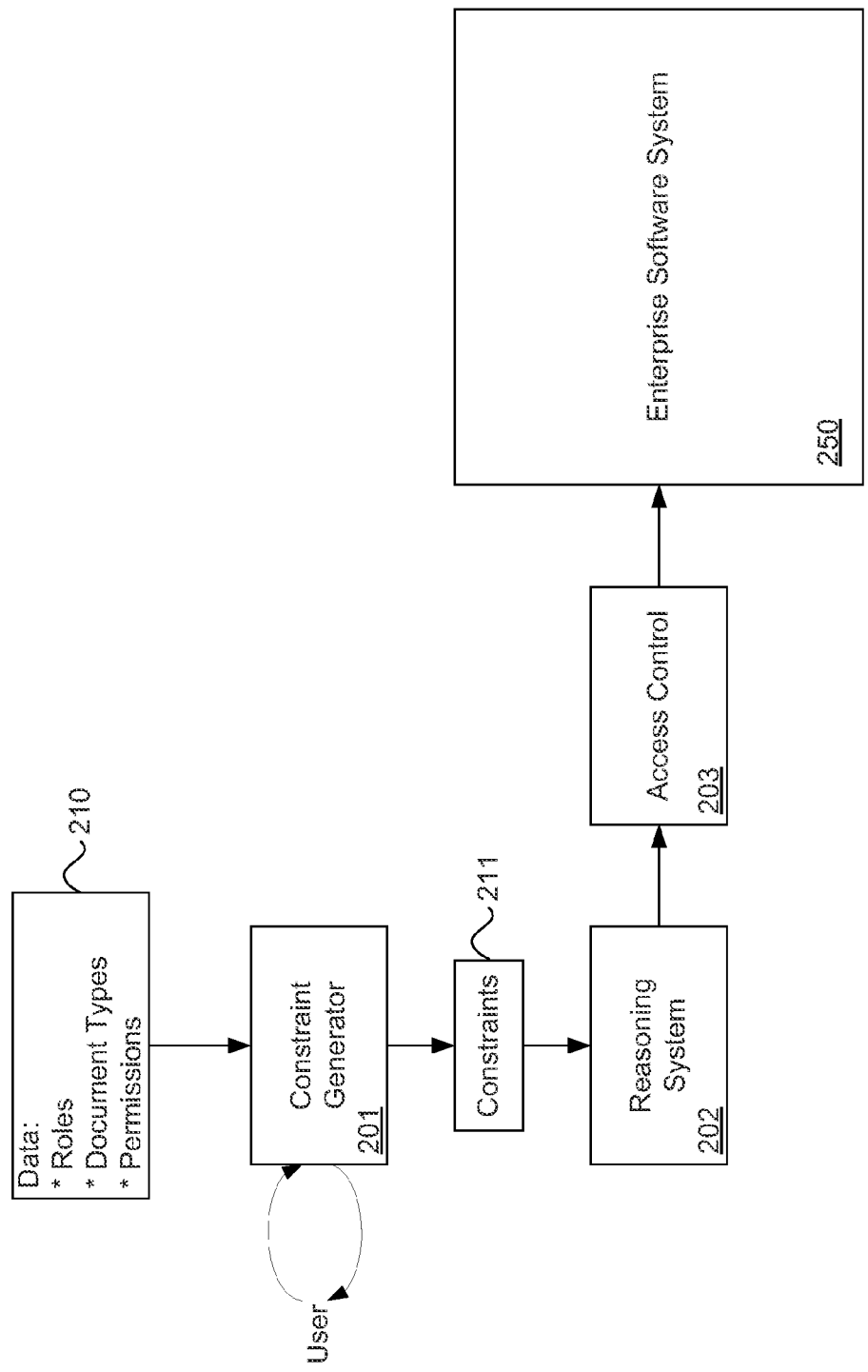
FIG. 2 illustrates an example system for generating constraints for controlling access to documents in a computer system according to an embodiment of the present invention.

FIG. 2 illustrates an example system for generating constraints for controlling access to documents in a computer system according to an embodiment of the present invention. Features and advantages of the present invention include storing data corresponding to roles, document types, and permissions, and using the data to generate constrains for setting access rights in a computer system. In FIG. 2, data 210 may include roles (e.g., HR, Purchasing, etc. . . . ), document types (e.g., spreadsheets, text documents, application pages, etc. . . . ), and permissions (e.g., mayOpen, mayWrite, mayApprove, etc. . . . ). In one embodiment, each role comprises a plurality of users assigned to the corresponding role, such as HR. Further, many documents may be included in a document type if the documents have a common characteristic. For example, documents may be associated with a particular document type based on format (e.g., MS Word® "text.doc" or MS Excel® "spreadsheet.xls"), a common topic, text versus spreadsheet versus presentation, date created, or any other characteristic. Permissions specify particular authorized actions based on the roles and the document types. For instance, a user in the HR department may be assigned an HR role, and the HR role may have an associated permission that authorizes the user to access a particular web page document pertaining to another employee's evaluation, but the same user role may not have access to the other employee's compensation, for example. Embodiments of the present invention may store the role, document type, and permission data in a three-dimensional model. While a variety of programming techniques may be used for relating roles, document types, and permissions in a three-dimensional model, the present disclosure uses matrices as an example.

In one embodiment, the stored data described above may be accessed by a software component, and the three-dimensional model may be converted into multiple two-dimensional models. In the example shown in FIG. 2, the software component is referred to as a constraint generator 201. Example conversions of a three-dimensional model of roles, document types, and permissions into two-dimensional models are provided below. The two-dimensional models may have numerous forms. For example, one two-dimensional model may have rows of users from each role and columns of document types. Another two-dimensional model may have rows of documents from the document types and columns of roles, for example. A third two-dimensional model may have rows of tuples comprising users and documents (User 1, Excel1.xls) and columns of permissions. An element at an intersection of a row and column may specify access rights between users, documents, and permissions. For instance, if an element is provided at an intersection of a user (e.g., User 1) and a document type (e.g., Users Manual), then the existence of the element may indicate that User 1 has a particular permission relating to all user's manuals (e.g., mayOpen). Additional examples and embodiments of converting a three-dimensional model into a two-dimensional model according to different embodiments of the invention are provided below.

Constraint generator 201 generates constraints 211 from the two-dimensional models to define access rights in a computer system. In one example embodiment, a user may interactively supplement the two-dimensional models. For example, after the two-dimensional models are created, a user may perform attribute exploration by interacting with constraint generator 201 to gain further knowledge about the relations between the users, documents, and permissions in the two-dimensional models. In Formal Concept Analysis ("FCA") attribute exploration may be used to get knowledge about the dependencies between the attributes of a context. Attribute exploration is an interactive computer algorithm. The algorithm asks a user (e.g., an access control specialist) whether an attribute implication is valid in the (unknown) context and the user may either answer "yes" or enter a counterexample for the implication so that implication no longer applies. This information may be used to supplement the relational data in from the three-dimensional model, for example, and use to generate more comprehensive constraints. The additional information is stored in the two-dimensional models as additional rows and columns, for example, and relations between entities.

Constraints 211 specify authorized actions represented by roles, document types, and permissions in the models. In one implementation, the present invention includes an innovative combination of the models described above with a reasoning software system 202 that controls access rights in an access control component 203 of a computer system 250, for example. Reasoning system 202 may be a semantic reasoning system. A semantic reasoning system (or "reasoning engine" or "reasoner") infers logical consequences from a set of asserted facts or axioms. In one example implementation of the present invention, axioms are generated as constraints 211, which are specified using description logics ("DL"). Description logics (DL) are a family of formal knowledge representation languages, and may be distinguished from propositional logic and first-order predicate logic. A Description Logic (DL) models concepts, roles, and individuals, and their relationships. Thus, embodiments of the present invention use DLs to capture knowledge embodied in the two-dimensional models described above for use in a reasoning system 211 to control access rights. Accordingly, constraints 211 may be received as DL axioms for controlling access rights in access control system 203 and enterprise system 250. More examples of a DL formalization of access constraints according to one implementation are provided below.

Figure 3:
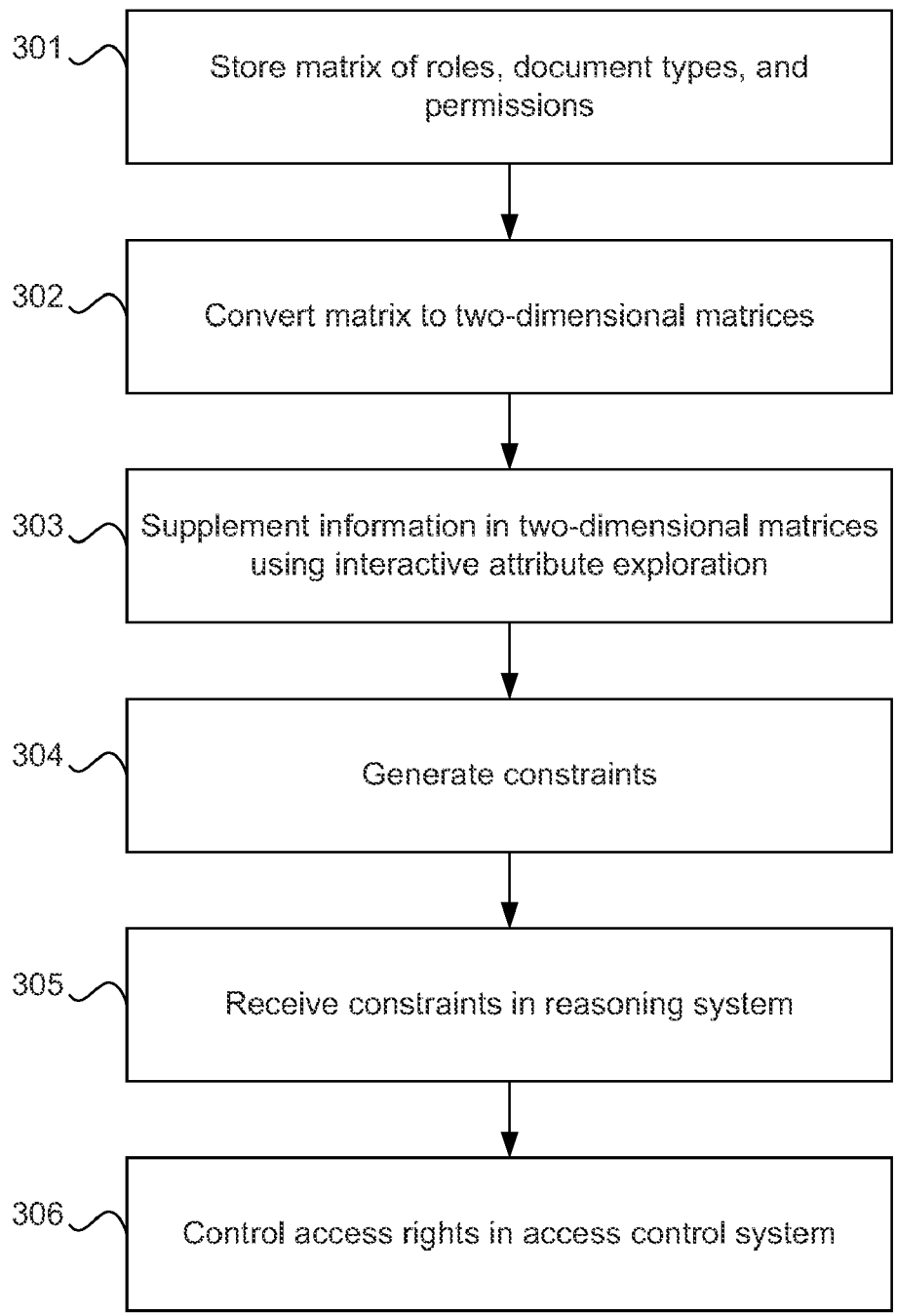
FIG. 3 illustrates an example method according to an embodiment of the present invention.
Figure 4:
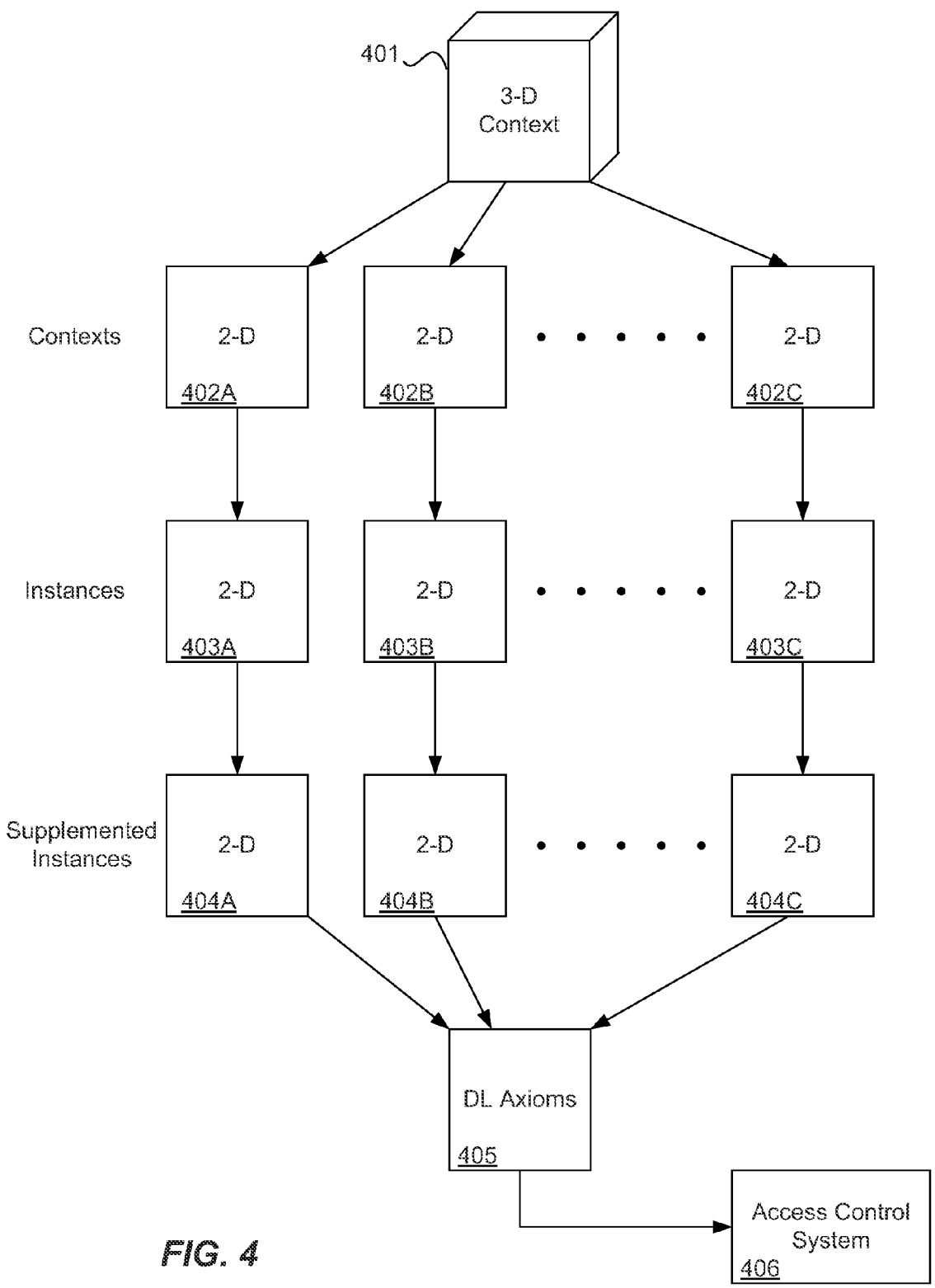
FIG. 4 illustrates three-dimensional to two-dimensional conversion according to an embodiment of the present invention.

FIG. 3 illustrates an example method according to an embodiment of the present invention. In one embodiment, the three-dimensional model is a three-dimensional matrix and the two-dimensional models are two-dimensional matrices. Accordingly at 301, a three dimensional matrix of roles, document types, and permissions is stored in a software component computer. FIG. 4 illustrates an example of three-dimensional to two-dimensional conversion. A three-dimensional matrix of "context" (roles, document types, and permissions) is shown at 401. Referring again to FIG. 3, at 302 the three-dimensional (3-D) matrix is converted to a two-dimensional (2-D) matrix. This is illustrated in FIG. 4 as 2-D contexts 402A-C. Example 2-D contexts are show in FIGS. 5A-D, which show 2-D matrices. Specifically, FIG. 5A shows a 2-D matrix (e.g., a cross table) for a particular permission "mayApprove", where rows are roles and columns are document types. An element at an intersection of a row and column may specify authorization of an action. In the example, in FIG. 5A, an element, "X", at an intersection of a row and column indicates that a particular role may approve a particular document type, and an empty element may indicate such an action is not authorized, for example, or that authorization is not known. For example, users associated with a "Service Consumer" role have rights to approve document types "Customer Contract Document" and "Term of Use Document." FIG. 5B similarly shows an example of a 2-D matrix for the permission "mayOpen," and FIG. 5C shows an example of a 2-D matrix for the permission "mayWrite."

In one embodiment, conversion of the 3-D model to 2-D models includes creation of one 2-D model for each permission as illustrated in FIGS. 5A-C and creation of the transpose of each such 2-D model. For example, for the matrices shown in FIG. 5A-C, additional matrices would be generated by taking the transpose of each matrix, where rows become columns and columns become rows. The result in this example is six (6) 2-D matrices.

Further, in one embodiment, an additional model is generated having rows of tuples comprising roles and documents types and columns of permissions.

In one embodiment, conversion of a 3-D model to a 2-D model may further include instantiation of the contexts in the models. Referring to FIG. 4, the contexts in 2-D models 402A-C are instantiated into 2-D contexts 403A-C. Instantiation may include substituting users for roles and documents for document types, for example. Accordingly, the rows of the matrix in FIG. 5A-C may be modified so that specific users associated with a role are substituted for each role, where different users are assigned different rows with the same relations to columns of document types as the role they are associated with. Similarly, the rows of document types of the transpose matrices may be modified so that specific documents associated with a document type are substituted for each document type, where different documents are assigned different rows with the same relations to columns of roles as the document type they are associated with. Further, for the matrix having rows of tuples comprising roles and documents types and columns of permissions, particular users and documents are substituted in for each role and document type. In one embodiment, all permutations of roles and document types are included as rows—e.g., if role1 includes users U1 and U2, and document type1 includes documents D1 and D2, the instantiation includes separate rows for [U1,D1], [U1,D2], [U2,D1], and [U2,D2]. The result of the above instantiations may include three types of models. For a given permission (e.g. mayApprove), a first model has rows of users from each role and columns of document types (e.g., instantiation of matrices in FIGS. 5A-C). As we have three types of permissions in our example, there are three of these models in the example above. A second model has rows of documents from the document types and columns of roles (e.g., instantiation of the transpose matrices). Similarly, there are three of these models as well in the example above. A third model has rows of tuples comprising users and documents and columns of permissions (e.g., instantiation of the matrix of row having tuples of roles and document types and columns of permissions). There is one of these models in the example above.

Referring again to FIG. 3, at 303, information in the 2-D matrices may be supplemented using interactive attribute exploration. For example, the system may include software with an attribute exploration algorithm to analyze the instantiated 2-D matrices and interactively generate questions for a user about access rights in the system. For example, based on the 2-D matrices, the system may generate the question "Is it true that any document that can be opened by a marketplace visitor can be opened by a service consumer as well?" If the answer is "yes" then the user enters "yes", but if the answer is "no", the user may enter "no" with a particular "counter example" of one or more particular documents that can be opened by marketplace visitors, but not by service consumers, for example. Instantiated and supplemented 2-D matrices derived from the 2-D matrices in FIG. 5A-C are shown in FIGS. 6A-C. In this example, there is only one agent (user) per role (e.g., marketplace visitor1 is a user in the marketplace visitor role and service provider1 is a user in the service provider role) and only one document per document type, but it is to be understood that if a role had multiple users then additional rows for each user would be added.

In this example, at 304 in FIG. 3, constraints are generated from the instantiated supplemented 2-D matrices. At 305, the constraints are received in a reasoning system. At 309, access rights in an access control system may be controlled to define allowable actions in a computer system, such as an Enterprise Computer System, for example.

Example Implementation

A specific implementation example is now provided with supporting disclosure for the implementation. The following example is illustrative of the concepts described herein but is not to be construed as limiting or excluding other embodiments. Role Based Access Control (RBAC) is a methodology for providing users in an IT system with specific permissions like write or read to users. It abstracts from specific users and binds permissions to user roles. Similarly, one can abstract from specific documents and bind permission to document types. Description Logics (DLs) are applied to formalize RBAC. RBAC matrices may have different possible interpretations and DLs can be used to capture RBAC constraints. In implementations using DLs, many constraints may be expressed, thus showing a benefit of using DLs in the RBAC setting. The explicit constraints given by the initial RBAC matrix are captured by DL axioms. For deriving additional constraints, a strict methodology may be used based on attribute exploration method known from Formal Concept Analysis. The attribute exploration allows systematically finding unintended implications and deriving additional constraints and making them explicit. The additional constraints are described with DL axioms as well. The example approach is applied to a real-life application below.

1 Introduction—Access Control Matrix, RBAC, Description Logics

An access control matrix M is an abstract formal computer security model which consists of a set of objects O, subjects S and actions A. Each matrix row represents a subject and each column represents an object. Each matrix element:

$$M[s,o] \subseteq A$$

is the set of actions which a subject:

$$s \in S$$

is allowed to perform on object:

$$o \in O.$$

For any type of access control system it can model the static access permissions, ignoring further definitions of a policy like rules and dynamic behavior in time. One example type of access control system is Role Based Access Control (RBAC), which abstracts from specific users and binds permissions to user roles. In this example, the permission set of a specific user is the union of all permissions of the roles he is assigned to. Flat RBAC comprises a set of users U, a set of roles R and a set of permissions P. Users are assigned to roles via a relation:

$$UA \subseteq U \times R,$$

and permissions are assigned to roles via a relation:

$$PA \subseteq R \times P.$$

One extension to this simple model is Hierarchical RBAC, which introduces a hierarchy of user roles for permission inheritance. The partial order:

$$\geq_R \subseteq R \times R$$

defines the role dominance relation. If a senior role:

$$r_s \in R$$

dominates a junior role:

$$r_j \in R,$$

it inherits all permission from it:

(i.e. $\forall p \in P : (r_j, p) \in PA \land (r_s, r_j) \in \geq_R \rightarrow (r_s, p) \in PA$)

The relationship between RBAC and other access control systems can be modeled with the access control matrix. In this example, the set of user roles is interpreted as the set of subjects (S=R) and we define permissions as a set of tuples of action and object:

$$(P \subseteq A \times O).$$

This is referred to as an RBAC matrix. An RBAC policy can not completely be described by an RBAC matrix, since it contains further constraints, e.g. rules, dynamic behavior in time, user role hierarchy, implications between the allowed actions etc. Objects do not need to be individuals but could also be abstract groups. As an example for the RBAC matrix, each row represents a user role and each column a document type.

Description Logic (DL) systems are formal knowledge representation and reasoning systems which provide inference services that deduce implicit knowledge from the explicitly represented knowledge. For these inference services to be feasible the underlying inference problems must at least be decidable, since DL is a decidable fragment of First Order Logic this is provided.

Formal Concept Analysis ("FCA") is a mathematical theory which derives formal concepts from a given formal context (i.e., a cross-table) and investigates the relationship amongst them. It can be applied in order to provide services to a security policy designer. In this example approach, a role-based access control matrix is formalized as triadic formal context:

$$K_{R,D,P} := (R,D,P,I),$$

with a set R of role names, a set D of document type names and a set P of permission names. Although it is quite straightforward to use an access control matrix as a model for RBAC, the interpretation of the matrix is not a priori clear. The following description contains a discussion of three interpretations of an RBAC matrix. The following illustrates how in each of the three possible interpretations, the information contained in the RBAC matrix may be correctly modeled by DL general concept inclusions (GCIs), for example. In the example below, the used DL is $\mathcal{ALEROI}$ which is a subset of $\mathcal{SROIQ}$, the basis for the W3C OWL 2 standard. This DL is required to simulate the concept product expressions:

$$R^I \times D^I \subseteq P^I \text{ and } (R^I \times D^I) \cap P^I = \emptyset.$$

Using DLs, additional constraints may be modeled which are intended by the RBAC engineer, but which cannot be modeled in role-based access control matrix alone. For example, for a review process, it is not allowed that the same person who writes a document also approves it. The inclusion of axiom mayWrite∩mayApprove⊂⊥ in the DL model defines that both permissions are disjoint. The DL model allows consistency checks of the RBAC policy with given additional restrictions. Both the higher expressiveness of a DL based modeling approach and the consistency check clearly show the benefit of using DLs for RBAC. Generally, one can say that ontology editors provide reasoning facilities, where for example the consistency of a DL knowledge base can be checked. Ontology editors generally support checking the soundness of a DL knowledge base. A strict methodology is introduced, based on the attribute exploration method of FCA, for deriving additional constraints in RBAC setting. The example methodology derives such constraints not explicitly contained in the RBAC matrix in a computer supported dialog with a user (e.g., the RBAC engineer). This helps the engineer to create the policy as DL model based on the matrix.

In Sec. 2 below, all relevant notions are formally defined, and the running example implementation is introduced. Moreover, in this section the three possible interpretations of an RBAC matrix are discussed. In Sec. 3, it is shown how the information of an RBAC matrix can be expressed by means of DL GCIs. In Sec. 4, the disclosure thoroughly discusses how attribute exploration can be used in this example in order to obtain additional constraints from the RBAC matrix, and how these constraints are then modeled with DL GCIs. In Sec. 4, the approach is applied to a real-life example. Finally, in Sec. 5 a summary of this disclosure is provided.

2 Example Definitions

In this section, all relevant notions which will be used in this section of the disclosure are formally defined for the purposes of this example, and a working example is introduced.

Vocabulary: As already mentioned, one starting point is a three-dimensional matrix, where the three dimensions are the roles, document types, and permissions. In order not to mix up user roles and DL roles, with "role" the term "user role" is used, whereas the OWL terminology "property" is used for a DL role. In an ongoing formalization, both roles and document types may be modeled as concept names of a (appropriately chosen) DL, and each permission may be modeled as a property between roles and document types. A DL vocabulary consists of a set R of role names, a set D of document type names, and of a set P of permission names. The vocabulary of these names may be denoted V. A working example with specific roles, document types and permissions may be used. For example, the permissions mayApprove, mayWrite and mayOpen, which are abbreviated by MA, MW and MO, respectively, are provided in an example implementation. The document types are user manual, marketing document, customer contract document, term of use document, installation guide, external technical interface document, design document and rating entry, abbreviated by UM, MD, CCD, ToUD, IG, ETID, DD, RE. The roles are marketplace visitor, service consumer, software development engineer, service vendor, legal department employee, service provider, marketing employee, technical editor and customer service employee, abbreviated by MV, SC, SDE, SV, LDE, SP, ME, TE and CSE. The documents are accessible by different roles with different permissions.

Formal Contexts: The three-dimensional matrix of roles, document types and permissions is formalized as a triadic formal context:

$$K_{R,D,P} := (R,D,P,I).$$

The example is provided in Table 1 shown in FIG. 7.

An attribute exploration will be conducted in order to explore dependencies between different roles, different document types, or different permissions. As attribute exploration is applied to dyadic contexts, such contexts may be derived from the triadic context. This can be done in several ways.

1. First, "slices" of the triadic context may be considered. In this example, the "slice" is each P∈P. That is, for a given P∈P, we consider:

$$K^P_{R,D} := (R,D,I^P), \text{ where } (R,D) \in I^P : \Leftrightarrow (R,D,P) \in I.$$

2. Next, consider the dyadic contexts, where the set of attributes is one of the sets R, D, P, and the set of objects is the cross-product of the remaining two sets. E.g. consider the context:

$$K_{R \times P, D} := (R \times P, D, I^{R \times P, D}) \text{ with}$$
$$((R,P),D) \in I^{R \times P, D} \Leftrightarrow (R,D,P) \in I.$$

This is a straight-forward transformation. To simplify notations, denote the incidence relation again by I, thus writing (R×D,P, I). Construct six dyadic contexts this way, namely $K_{R \times D, P}$, $K_{P \times R, D}$, $K_{D \times P, R}$ and the respective named variants with identical cross tables $K_{D \times R, P}$, $K_{R \times P, D}$, $K_{P \times D, R}$.

3. For a given context K:=(G, M, I), when attribute exploration is conducted, sometimes it is sensible to add an additional attribute ⊥ (which satisfies: ¬∃g∈G: (g,⊥)∈I) to M. In this example, K⊥:=(G,M∪{⊥}, I) is used to denote this context (the symbol 'I' is reused for the incidence relation). In this example no agent will be allowed to write and approve the same document, thus mayApprove∧mayWrite→⊥.

As each of the formal contexts only deals with names for roles, document types, and permissions, but not with instances of these names (in some DL interpretations, see below), all these formal contexts are called T-contexts.

Interpretations: The DL-interpretations for RBAC matrices in this example are straight-forwardly defined. For our setting, a DL-interpretation for V is a pair (Δ, ·$^I$) with a non-empty universe (of discourse) Δ and an interpretation function ·$^I$ which satisfies:

$R^I \subseteq \Delta$ for each R∈R. Moreover, set $R^I := \cup_{R \in R} R^I$. The elements r∈$R^I$ are called agents.

$D^I \subseteq \Delta$ for each D∈D. Moreover, set $D^I := \cup_{D \in D} D^I$.

$P^I \subseteq R^I \times D^I$ for each P∈P $R^I \cap D^I = \emptyset$ (nothing is both agent and document)

$R^I \cup D^I = \Delta$ (everything is either agent or document)

Note that the first two conditions are standard conditions for DL interpretations, whereas the last 3 condition are additional constraints.

Permissive, Prohibitive and Strict Interpretations: As each formal object and attribute of (R,D,P, I) stands in fact for a whole class of agents resp. documents, it is not a priori clear what the semantics of the incidence relation I with respect to an interpretation (Δ, ·$^I$) is. So the meaning of I may be clarified. First it may be assumed that a relationship (R, D, P)∈I means that each agent r∈$R^I$ has the permission $P^I$ for each document d∈$D^I$. So a cross in the crosstable of the context (R, D, $I^P$) grants permissions to agents on documents, and it can be read from the context which permissions are at least granted to agents. Vice versa, it may be assumed that a missing relationship (R, D, P)∉I means that no agent r∈R$^I$ has the permission P$^I$ for any document d∈D$^I$. So a missing cross in the cross-table of the context (R, D, I$^P$) prohibits that permissions are granted to agents, and it can be read from the context which permissions are at most granted to agents. And finally, it could of course be assumed that both conditions hold. That is, one can read from the context which permissions are precisely granted to agents.

TABLE 2

Variants how to interpret a cross in the context

| | interpretation cross | no cross |
|---|---|---|
| strict | permission for all individuals | prohibition for all individuals |
| permissive | permission for all individuals | permission for some individuals |
| prohibitive | permission for some individuals | prohibition for all individuals |

These three understandings lead to the notion of permissive, prohibitive and strict interpretations (with respect to the formal context) summarized in Table 2 above. They are formally defined as follows:

An interpretation $(\Delta, \cdot^I)$ is called permissive (with respect to $K_{R,D,P}$), and we write $(\Delta, \cdot^I) \models +(R,D,P,I)$, iff. for all role names R∈R, all document type names D∈D all permission names P∈P we have:

$$(R,D,P) \in I \Rightarrow \forall r \in R^I \forall d \in D^I : (r,d) \in P^I$$

In other words, if (R, D, P)∈I, we have $R^I \times D^I \subseteq P^I$.

An interpretation $(\Delta, \cdot I)$ is called prohibitive (with respect to $K_{R,D,P}$), and we write $(\Delta, \cdot^I) \models \_(R,D,P,I)$, iff. for all role names R∈R, all document type names D∈D all permission names P∈P we have:

$$(R,D,P) \notin I \Rightarrow \forall r \in R^I \forall d \in D^I : (r,d) \notin P^I$$

In other words, if (R,D,P)∉I, we have $(R^I \times D^I) \cap P^I = \emptyset$.

An interpretation $(\Delta, \cdot^I)$ is called strict (with respect to $K_{R,D,P}$), iff. it is both permissive and prohibitive.

We say that we use the permissive approach (prohibitive approach, strict approach), if we assume that each interpretation is permissive (prohibitive, strict).

Instantiations of Contexts: As already said in the introduction, it will turn out that for running attribute exploration on the context, it is reasonable not to consider the T-context, but contexts where on the side of the objects, roles are replaced by "real" users resp. document types are replaced by "real" documents. Essentially, instantiations of a context contain at least all rows of the given context, and there might be more rows, but these additional rows must be extensions of rows in the given context. These contexts are now introduced.

Let one of the contexts $K^P_{R,D} := (R, D, I^P)$ (P∈P) be given. An instantiation of $K^P_{R,D}$ is a context (R, D, J$^P$), where R is a set of agents such that:

$$\forall R \in R \exists r \in R \forall D \in D : (R,D) \in I^P \Leftrightarrow (r,D) \in J^P$$

$$\forall r \in R \exists R \in R \forall D \in D : (R,D) \in I^P \Leftrightarrow (r,D) \in J^P$$

Such a context will be denoted $K^P_{R,D}$. We define similarly the instantiations $K_{R \times P, D}$ of $K_{R \times P, D}$, and $K_{P \times R, D}$ of $P_{P \times R, D}$ (where again the role names are replaced by agents), as well as the instantiations $K^P_{D,R}$ of $K^P_{D,R}$ (P∈P), $K_{D \times P, R}$ of $K_{D \times P, R}$, and $K_{P \times D, R}$ of $K_{P \times D, R}$ (where now the document type names are replaced by documents). Instantiations of the contexts where the permissions are the attributes, i.e. instantiations $K_{D \times R, P}$ of $K_{D \times R, P}$ (resp. $K_{R \times D, P}$ of $K_{R \times D, P}$) are defined similarly (where on the side of the objects, both document type names and role names are replaced by "real" documents and "real" agents, respectively). An example for an instantiation of $K^{mayWrite}_{R,D}$ is given in Table 3 in FIG. 8.

3 Expressing the Cross-Table by GCIs

In this section, we scrutinize how the information of the context $K_{R,D,P}$ can be expressed by means of DLs. Besides the standard DL quantifications ∃R·C (the set of entities which stand in relation R to at least one instance of C) and ∀R·C (the set of entities which stand in relation R only to instances of C), we will use the non-standard constructor ∀C·R (the set of entities which stand in relation R to all instances of C). This constructor can be expressed by means of negation of relations, as ∀C·R is equivalent to ∀¬R·¬C. Adding it to ALC still yields a decidable DL, but as this constructor is certainly non-standard, is it not supported by common DL reasoners.

For the permissive approach, we have to capture the condition $R^I \times D^I \subseteq P^I$. The left expression is a concept product. It cannot be expressed in SHOIN(D), which is the underlying DL of OWL DL. In OWL 2, there does not exist a native language construct for the concept product, but it may be expressed in OWL 2. Using the constructor ∀C·R, the condition $R^I \times D^I \subseteq P^I$ can be expressed with the GCIs:

$$R \sqsubseteq \forall D \cdot P \text{ (i.e. } R \sqsubseteq \forall \neg P \cdot \neg D \text{) and } D v \sqsubseteq \forall R \cdot P^{-I} \text{ (i.e.}$$
$$D \sqsubseteq \forall \neg P^{-I} \cdot \neg R)$$

For the prohibitive approach, the condition $(R^I \times D^I) \cap P^I = \emptyset$ has to be captured. This can be expressed by the two GCIs:

$$R \sqsubseteq \forall P \cdot \neg D \text{ and } D \sqsubseteq \forall P^{-1} \cdot \neg R$$

Note that this condition is precisely the condition for the permissive approach, when we replace each permission P by its complement ¬P. This duality principle will be discussed in the next section.

If we knew that $K_{R,D,P}$ is correct, and if we know which type of approach (permissive, prohibitive, strict) we use, then we can describe the information of $K_{R,D,P}$ by DL GCIs. We first set:

$$R_{all} := \cup_{R \in R} R \text{ and } D_{all} := \cup_{D \in D} D$$

Now we define the following knowledge base:

$$KB_0 := \{R_{all} \sqsubseteq \forall P \cdot T, D_{all} \sqsubseteq \forall P^{-1} \cdot T | P \in P\} \cup \{R_{all} \sqsubseteq \neg D_{all}\} \overline{\sqcap} \{R_{all} \cup D_{all} \equiv T\}$$

Obviously, a general DL-interpretation $(\Delta, \cdot^I)$ is a DL-interpretation of V iff it satisfies $KB_0$. According to the chosen approach, we can now capture the information of $K_{R,D,P}$ as follows:

$$KB_+ := KB_0 \cup \{R \sqsubseteq \forall D \cdot P, D \sqsubseteq \forall R \cdot P^{-I} | (R,D,P) \in I\}$$

$$KB_- := KB_0 \cup \{R \sqsubseteq \forall P \cdot \neg D, D \sqsubseteq \forall P^{-I} \cdot \neg R | (R,D,P) \notin I\}$$

$$KB_\pm := KB_+ \cup KB_-$$

Again, a DL-interpretation is obviously an permissive (prohibitive, strict) interpretation of $K_{R,D,P}$, if it satisfies $KB_+$ ($KB_-$, $KB_\pm$).

4 Using Attribute Exploration for RBAC Matrices

In this section, we discuss how attribute exploration can be utilized in order to create a DL knowledge base which captures as best as possible the dependencies between roles, documents, and permissions. It is crucial to determine an appropriate approach. Thus, we first elaborate the differences between the potential approaches (permissive, prohibitive, strict) with respect to attribute exploration. In the second and third part of this section, we go into the details of an attribute exploration for instantiations of contexts in the permissive approach.

4.1 General Discussion

We first compare the permissive and the prohibitive approach. In the permissive approach, the crosses in a crosstable carry information, whereas missing crosses are not informative. In the prohibitive approach, the situation is converse: Missing crosses carry information, and crosses are not informative. Missing crosses in a relation correspond to crosses in the complement of the relation. Thus if we replace in the prohibitive approach the relations mayOpen, mayWrite and mayApprove by their complements mayOpen$^c$=mustNotOpen, mayWrite$^c$=mustNotWrite, mayApprove$^c$=mustNotApprove, we have a situation similar to the permissive approach. That is, we have the following duality principle: Any account to the permissive approach can be turned into an account to the prohibitive approach (and vice versa) by replacing each permission by its complement. However, switching between the permission and prohibitive approaches may require changing the underlying DL language, including non-standard constructors for the permissive approach. For this reason, we do not target the prohibitive approach in this example.

We assume that the set of role names, document type names, and permission names is fixed. Conducting an attribute exploration on one of the T-contexts seems for this reason to some extent pointless, as we cannot add new objects (counterexamples for implications which do not hold). We can still use attribute exploration in order to check that the information in $K_{R,D,P}$ is correct, but this idea does not tap the full potential of attribute exploration and will not be carried out in here (we assume that the matrix $K_{R,D,P}$ is correct). But notice that this check for correctness avoid an inconsistency between role hierarchy, DL model and access matrix. In the formal context, the formal objects (the elements of R) and attributes (the elements of D) stand in turn for complete classes (of agents and documents). This can be used to apply attribute exploration to RBAC matrices. Assume we use the permissive approach. Assume moreover that we consider a permissive interpretation $(\Delta, \cdot^I)$ with respect to $K_{R,D,P}$. Then for a given permission P∈P, agent r∈R$^I$ for a role R∈R, and document d∈D$^I$ for a document type D∈D, we might have that r has permission P to d (i.e., (r, d)∈P$^I$), though we do not have (R,D, P)∈I. That is, it is sensible to run an attribute exploration on the instantiations of the T-contexts. As we will see in the next section, with attribute exploration we can in fact infer constraints for the dependencies between roles, documents, and permissions which are not captured by $K_{R,D,P}$.

In the strict approach, the situation is different. If we consider a strict interpretation $(\Delta, \cdot^I)$ with respect to $K_{R,D,P}$, then for a given permission P∈P, agent r∈R$^I$ and document d∈D$^I$, we have (r, d)∈P$^I$, (R,D, P)∈I. That is, based on the given assumption that the sets of roles, documents, and permissions are fixed, all possible constraints for the dependencies between these entities are already captured by $K_{R,D,P}$. This observation has two consequences: First, no DL formalization of the strict approach can extend the information of $K_{R,D,P}$, i.e., a DL formalization of $K_{R,D,P}$ is somewhat pointless. Second, the instantiations of T-context are nothing but the T-context themselves (instantiations might duplicate some rows, but this is of course of no interest), thus conduction attribute exploration in the strict approach is pointless as well.

To summarize: In this example the permissive and prohibitive approach are mutually dual, and addressing the strict approach with DLs or attribute exploration is pointless. Thus, in this example it is sufficient that we address only the permissive approach.

4.2 Attribute Exploration for Instantiations of T-contexts

In the last part we argued why we will run attribute exploration on instantiations of T-contexts. Before doing so, we first have to discuss how implications in T-contexts and their instantiations are read, and then we will scrutinize some peculiarities for applying attribute exploration in our setting. In fact, due to the fact that the objects and attributes of $K_{R,D,P}$ stand for whole classes, the existing approaches for conducting attribute explorations on triadic contexts cannot be applied to our framework.

Reading Implications We consider the two contexts of Table 3 in FIG. 8. In both contexts, term of use document→customer contract document holds. For the T-context $K^{mayWrite}_{R,D}$, the objects are classes, thus this implication is read as follows:

T-reading: For each role we have that whenever every agent of that role may write all terms of use documents, then every agent of that role may write all customer contract documents as well.

For the instantiation of $K^{mayWrite}_{R,D}$, the objects are now instances instead of classes, thus we have a different reading of the implication. It is:

I-reading: Whenever every agent may write all terms of use documents, then the agent may write all customer contract documents as well.

Implications like this cannot be read from any T-context, thus running attribute exploration on instantiations can indeed be used to obtain new knowledge.

Please note that none of the above readings conforms to the concept inclusion term of use document ⊑ customer contract document. This is due to in both implications we quantify over all term of use documents and all customer contract documents. For the latter reading, we now show how it is correctly translated into a GCI. The implication means that for any permissive interpretation $(\Delta, \cdot^I)$, we have that:

$$\forall r \in R^I : (\forall d \in ToUD^I : (r,d) \in MW^I \rightarrow \forall d \in CCD^I : (r,d) \in MW^I)$$

holds. This condition is now transformed into a GCI as follows:

$$\forall r \in R^I :\_(\forall d \in eToUD^I : (r,d) \in MW^I \rightarrow \\ \forall d \in CCD^I : (r,d) \in MW^I)$$

$$\Leftrightarrow \forall r \in R^I : (r \in (\forall ToUD \cdot MW)^I \rightarrow r \in (\forall CCD \cdot MW)^I)$$

$$\Leftrightarrow (\Delta, \cdot^I) \models \forall ToUD \cdot MW \sqsubseteq \forall CCD \cdot MW$$

(we have to emphasize that the direction "→" of the last equivalence is only valid if we assume that dom(MW$^I$) ⊂ R$^I$ holds, but we assume that our interpretation satisfies $\overline{KB_0}$, which models this additional condition).

In general, any implication of the form $D_1\hat{}\ldots\hat{}D_{n-1} \rightarrow D_n$ in an instantiation of one of the contexts $K^P_{R,D}$ can be translated into the following GCI:

$$\forall D_1 \cdot P \sqcap \ldots \sqcap \forall D_{n-1} \cdot P \sqsubseteq \forall D_n \cdot P$$

Similarly, any implication of the form $R_1\hat{}\ldots\hat{}R_{n-1} \rightarrow R_n$ in an instantiation of one of the contexts $K^P_{D,R}$ can be translated into the following GCI:

$$\forall R_1 \cdot P^- \sqcap \ldots \sqcap \forall R_{n-1} \cdot P^- \sqsubseteq \forall R_n \cdot P^-$$

If we consider an instantiation of a context where the attributes of the context are neither document type names nor role names, but instead permission names, the situation is different, as now the attributes do not stand for classes of instances, but for properties between instances. In Sec. 5.1, we consider a context $K_{D \times R,P}$. In this context, mayWrite→mayOpen holds. The reading of this implication is Whenever some agent has the permission to write some document, then this agent may open this document as well.

So we see that in this case, the implication can be translated to a simple inclusion axiom between properties, namely mayWrite ⊑ mayOpen.

4.3 Conducting Attribute Exploration on Instantiations

We consider the instantiation of a T-context, where we want to run attribute exploration on. For any T-context K, there exists a smallest instantiation $K_{min}$, which is isomorphic to K, and a largest instantiation $K_{max}$. In this example, we start the attribute exploration with $K_{min}$, and for implications which do not hold, we add (as usual) counterexamples to the context, until we finally reach a context $K_{ae}$. In this example process, we do not add counterexamples in an arbitrary manner, as the context $K_{ae}$ we obtain must still be an instantiation. The question is how this additional constraint can be captured by attribute exploration. First of all, we trivially have the following subset relations between the implications which hold in the contexts:

$$\text{Imp}(K_{max}) \subseteq \text{Imp}(K_{ae}) \subseteq \text{Imp}(K_{min})$$

So if we run an attribute exploration on $\text{Imp}(K_{min})$, we could use $\text{Imp}(K_{max})$ as a set of additional background implications. A closer observation yields that $\text{Imp}(K_{max})$ only contains all implications of the form ∅→m, where m is an attribute of $K_{min}$ which applies to all objects. This can easily be seen as follows:

Let $K_{min}(O_{min}, M, I_{min})$, let $K_{max} := (O_{max}, M, I_{max})$, let
$M_1 := \{m \in M | \forall o \in O_{min}: (o,m) \in I_{min}\}$ and $M_2 := M - M_1$ be the complement of $M_1$.

First of all, we obviously have that; ∅→$m_1$ holds in $K_{min}$, thus in $K_{max}$ as well, for each $m_1 \in M_1$. Now let $m_2 \in M_2$. Then there exists an object $o \in O_{max}$ with $(o,m) \in I_{max} \Leftrightarrow m \neq m_1$ for all m∈M. That is, there cannot exist any (nontrivial) implication in $\text{Imp}(K_{max})$ with $m_2$ in its conclusion.

4.4 Choice of Instantiation Contexts for Attribute Exploration

It is possible to conduct an attribute exploration on the minimal instantiation of $K_{R \times P,D}$. We observe that any instantiation of $K_{R \times P,D}$ is the subposition of instantiations of the contexts $K^P_{R,D}$, P∈P. Generally, for any contexts $K_1, \ldots, K_n$ with identical attribute sets, an implication holds in each context $K_1, \ldots, K_n$ if and only if it holds in the subposition of these contexts. Thus, if the RBAC engineer runs an attribute exploration on the minimal instantiation of all contexts $K^P_{R,D}$, P∈P, there is no need to run an attribute exploration on the minimal instantiation of $K_{R \times P,D}$.

The discussion above applies to the context $K_{D \times P,R}$ as well. To summarize: For a complete investigation of $K_{R,D,P}$, it is sufficient that the RBAC engineer run an attribute exploration on the minimal instantiations of the following contexts:

$K^P_{R,D}$ for each permission P∈P to infer document implications $K^P_{D,R}$ for each permission P∈P to infer role implications $K_{R \times D,P}$ to infer permission implications For the context $K_{R \times D,P}$, one could add the additional attribute ⊥ in order to obtain constraints which express the disjointness of some permissions.

5 Evaluation of the Approach for a Real-Life-Example

In this section, we apply the example approach to implementation introduced in Table 1 of FIG. 7. Due to space limitations, we do not conduct a complete attribute exploration: Instead we consider only the contexts $K_{D \times R,P}$ and $K^{MO}_{D,R}$.

5.1 Attribute Exploration for $K_{D \times R,P}$.

Figure 9:
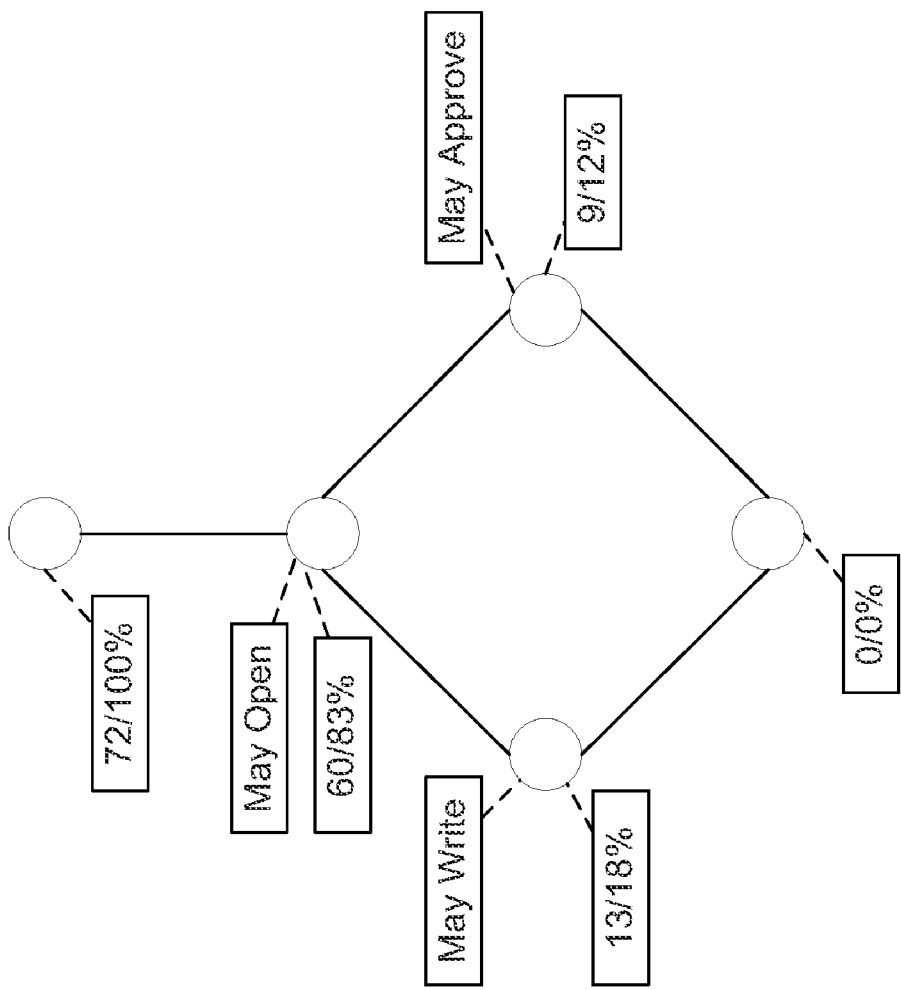
FIG. 9 illustrates another two-dimensional matrix and a concept lattice according to an embodiment of the present invention.

In this section, we conduct the attribute exploration on the minimal instantiation $K_{min}$ of $K_{D \times R,P}$. For this exploration, as discussed in Sec. 2, we added an additional attribute ⊥ to the set of attributes. An excerpt of $K_{min}$, together with its concept lattice, is provided in FIG. 9. This is the context the RBAC engineer starts the attribute exploration on. In $K_{D \times R,P}$, thus in $K_{min}$, we have the following implications:

| | |
|---|---|
| MW→MO | 1. |
| MA→MO | 2. |
| ⊥→MO ∧ MW ∧ MA | 3. |
| MO ∧ MW ∧ MA→⊥ | 4. |

The first implication is read: Whenever some agent can write some document, then this agent can open this document as well. It can easily be verified that this implication should indeed hold in any interpretation $K_{R,D,P}$, so we add the property inclusion mayWrite ⊑ mayOpen to our DL knowledge base. This is the first example of a statement which can be modeled with a DL statement, but not with matrix $K_{R,D,P}$ alone.

The next implication can be handled analogously, and we add the inclusion mayApprove ⊑ mayOpen to the knowledge base.

The third implication trivially holds due to the definition of ⊥.

The last implication can, due to the first two implications, be simplified to MW ∧ MA→⊥. Due to the definition of ⊥, this is read: No agent can both write and approve some document. Again, the engineer decides that this implication is valid. Thus she adds the disjoint property axiom MW ⊓ MA ⊑ ⊥ to the knowledge base.

If it is later verified that the complete RBAC policy is consistent, which can be done with a DL reasoner, then each document which can be written or can be approved has to be readable and furthermore no document can be written and approved by the same agent. These are constraints which have not been contained in the matrix but where derived by our methodology.

5.2 Attribute Exploration for $K^{mayOpen}_{D,R}$.

For a second example, attribute exploration is performed on the minimal instantiation context $K_{min}$ of $K^{mayOpen}_{D,R}$. The context $K_{min}$ looks like the left third of the cross table in Tab. 1 in FIG. 7 despite that it is transposed and document types are replaced by documents (columns are roles, rows are documents). Due to space limitation, we do not conduct a complete attribute exploration on $K_{min}$, but only provide an example for a valid and an invalid implication. Let us first note that in $K^{mayOpen}_{D,R}$, the attributes SV, LDE and CSE apply to all objects. So, according to the discussion in the implications ∅→SV, ∅→LDE and ∅→CSE hold in all instantiations of in $K^{mayOpen}_{D,R}$, thus we can add the GCIs ⊤ ⊑ ∀SV·mayOpen⁻, ⊤ ⊑ ∀LDE·mayOpen⁻ and ⊤ ⊑ ∀CSE·mayOpen⁻ to our knowledge base.

An example for an implication of $K_{min}$ is TE→ME. During the attribute exploration, the RBAC engineer has to decide whether this implication holds in all desired interpretations of in $K^{mayOpen}_{D,R}$. In fact there might be a contract document in preparation by a technical editor which is not allowed to be opened by a marketing employee. Thus the RBAC engineer adds a counterexample to the context (CCD_in_prep, TE, MO)∈I and (CCD_in_prep, ME, MO)∉I.

Another example for an implication of $K_{min}$ is MV→SC. In fact, the RBAC engineer realizes that this implication must hold: Any document which can be opened by a marketplace visitor can be opened by a service consumer as well. So she adds the GCI ∀MV·mayOpen⁻ ⊆ ∀SC·mayOpen⁻ to the knowledge base. This is again an example which cannot be derived from $K_{R,D,P}$ alone.

6 Conclusion

In this example we used the access control matrix as basic model for the behavior of RBAC and called this an RBAC matrix. We discussed three interpretations of an RBAC matrix and described that for the permissive approach additional constraints can be derived which are not contained in the RBAC matrix. This additional information was added to a so called RBAC policy, modeled in DL. For obtaining a complete RBAC policy, we introduced a strict methodology, based on FCA. The general approach was to derive different dyadic context from RBAC matrix context $K_{R,D,P}$ and conduct an attribute exploration on them. The attribute exploration allowed finding unintended implications and to derive constraints and make them explicit.

Example Hardware Implementation

Figure 10:
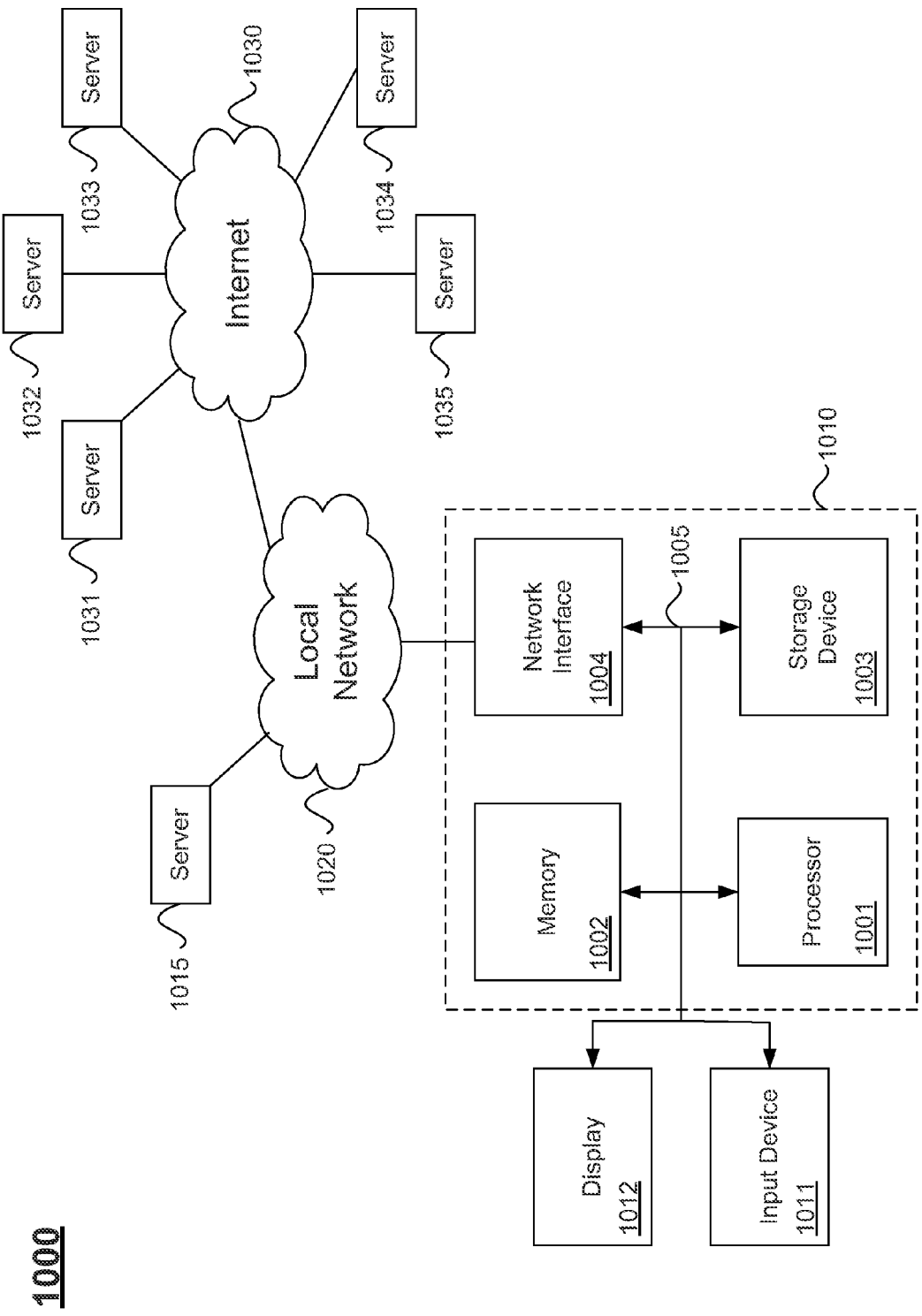
FIG. 10 illustrates hardware of a special purpose computing machine configured with a process according to one embodiment of the present invention.

FIG. 10 illustrates hardware 1000 of a special purpose computing machine configured with a constraint generation process for use in an access control system according to one embodiment of the present invention. An example computer system 1010 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. The above storage devices and memories are examples of computer readable storage mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information through the network interface 1004 across a local network 1020, an Intranet, or the Internet 1030. For a local network, computer system 1010 may communicate with a plurality of other computer machines, such as server 1015. Accordingly, computer system 1010 and server computer systems represented by server 1015 may form a cloud computing network, which may be programmed with processes described herein. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    storing data corresponding to a plurality of roles, a plurality of document types, and a plurality of permissions, wherein each role includes a plurality of users assigned to the corresponding role, wherein each document type is associated with a plurality of documents having at least one common characteristic, and wherein permissions specify authorization to perform particular actions based on said roles and said document types, and wherein the roles, documents types, and permissions are related according to a three-dimensional model;
    converting the three-dimensional model into a plurality of two-dimensional models, the plurality of two-dimensional models comprising a first model having rows of users from each role and columns of document types, a second model having rows of documents from the document types and columns of roles, and a third model having rows of tuples comprising users and documents and columns of permissions, wherein an element at an intersection of a row and column specifies access rights between users, documents, and permissions; and
    generating constraints from the two-dimensional models to define access rights in a computer system.

2. The method of claim 1 wherein the constraints are specified using description logic.

3. The method of claim 2 wherein the description logic is received by a reasoning software system, the reasoning software system controlling access rights in an access control component of a computer system.

4. The method of claim 1 further comprising interactively, with a user, performing attribute exploration, and in accordance therewith, supplementing one or more of said two-dimensional matrices.

5. The method of claim 1 wherein the first model corresponds to a first permission of the plurality of permissions, the plurality of two-dimensional models further comprising a fourth model corresponding to a second permission of the plurality of permissions, the fourth model having rows of users from each role and columns of document types.

6. The method of claim 1 wherein the second model corresponds to a first permission of the plurality of permissions, the plurality of two-dimensional models further comprising a fourth model corresponding to a second permission of the plurality of permissions, the fourth model having rows of documents from the document types and columns of roles.

7. The method of claim 1 wherein the columns of permissions in the third model include a column corresponding to no permissions.

8. The method of claim 1 wherein the three-dimensional model and the two-dimensional models are matrices.

9. A non-transitory computer readable storage medium embodying a computer program for performing a method, said method comprising:
storing data corresponding to a plurality of roles, a plurality of document types, and a plurality of permissions, wherein each role includes a plurality of users assigned to the corresponding role, wherein each document type is associated with a plurality documents having at least one common characteristic, and wherein permissions specify authorization to perform particular actions based on said roles and said document types, and wherein the roles, documents types, and permissions are related according to a three-dimensional model;
converting the three-dimensional model into a plurality of two-dimensional models, the plurality of two-dimensional models comprising a first model having rows of users from each role and columns of document types, a second model having rows of documents from the document types and columns of roles, and a third model having rows of tuples comprising users and documents and columns of permissions, wherein an element at an intersection of a row and column specifies access rights between users, documents, and permissions; and
generating constraints from the two-dimensional models to define access rights in a computer system.

10. The non-transitory computer readable medium of claim 9 wherein the constraints are specified using description logic.

11. The non-transitory computer readable medium of claim 10 wherein the description logic is received by a reasoning software system, the reasoning software system controlling access rights in an access control component of a computer system.

12. The non-transitory computer readable medium of claim 9, the method further comprising interactively, with a user, performing attribute exploration, and in accordance therewith, supplementing one or more of said two-dimensional matrices.

13. The non-transitory computer readable medium of claim 9 wherein the first model corresponds to a first permission of the plurality of permissions, the plurality of two-dimensional models further comprising a fourth model corresponding to a second permission of the plurality of permissions, the fourth model having rows of users from each role and columns of document types.

14. The non-transitory computer readable medium of claim 9 wherein the second model corresponds to a first permission of the plurality of permissions, the plurality of two-dimensional models further comprising a fourth model corresponding to a second permission of the plurality of permissions, the fourth model having rows of documents from the document types and columns of roles.

15. The non-transitory computer readable medium of claim 9 wherein the columns of permissions in the third model include a column corresponding to no permissions.

16. The non-transitory computer readable medium of claim 9 wherein the three-dimensional model and the two-dimensional models are matrices.

17. A computer system comprising:
at least one processor; and at least one memory, wherein the processor and the memory are configured to: store data corresponding to a plurality of roles, a plurality of document types, and a plurality of permissions, wherein each role includes a plurality of users assigned to the corresponding role, wherein each document type is associated with a plurality documents having at least one common characteristic, and wherein permissions specify authorization to perform particular actions based on said roles and said document types, and wherein the roles, documents types, and permissions are related according to a three-dimensional model;
convert the three-dimensional model into a plurality of two-dimensional models, the plurality of two-dimensional models comprising a first model having rows of users from each role and columns of document types, a second model having rows of documents from the document types and columns of roles, and a third model having rows of tuples comprising users and documents and columns of permissions, wherein an element at an intersection of a row and column specifies access rights between users, documents, and permissions; and
generate constraints from the two-dimensional models to define access rights in a computer system.

18. The computer system of claim 17 wherein the constraints are specified using description logic.

19. The computer system of claim 18 wherein the description logic is received by a reasoning software system, the reasoning software system controlling access rights in an access control component of a computer system.

20. The computer system of claim 17 wherein the processor and the memory further are configured to interactively, with a user, performing attribute exploration, and in accordance therewith, supplementing one or more of said two-dimensional matrices.

* * * * *